United States Patent [19]
Hertel

[11] 3,898,452
[45] Aug. 5, 1975

[54] ELECTRON MULTIPLIER GAIN STABILIZATION

[75] Inventor: Richard J. Hertel, Fort Wayne, Ind.

[73] Assignee: International Telephone and Telegraph Corporation, Nutley, N.J.

[22] Filed: Aug. 15, 1974

[21] Appl. No.: 497,782

[52] U.S. Cl. .......... 250/207; 250/213 VT; 250/214; 330/42
[51] Int. Cl. .......... H01j 43/30
[58] Field of Search .......... 250/207, 213 R, 213 VT, 250/214; 330/42

[56] References Cited

UNITED STATES PATENTS 2,854,583 9/1958 Robinson .......... 250/207 X
3,170,032 2/1965 Evans, Jr. et al. .......... 250/207 X
3,557,373 1/1971 Hess .......... 250/207

*Primary Examiner*—James W. Lawrence
*Assistant Examiner*—E. R. LaRoche
*Attorney, Agent, or Firm*—John T. O'Halloran; Menotti J. Lombardi, Jr.; Edward Goldberg

[57] ABSTRACT

The gain of an electron multiplier is proportional to the ratio of the mean square output noise current with respect to the direct current at the anode. This ratio is compared with a reference level and the difference or error signal is used to vary the high voltage supply to control the gain.

6 Claims, 2 Drawing Figures

ELECTRON MULTIPLIER GAIN STABILIZATION

BACKGROUND OF THE INVENTION

1. Field of the Invention

The present invention is directed to a novel system for measuring and controlling the gain of electron multipliers.

2. Description of the Prior Art

The gain of electron multipliers, such as used in photomultiplier and image dissector tubes and in corresponding semiconductor type diode photodetectors, is highly sensitive and subject to variations. Such variations occur with changing circuit and internal parameters and over long periods of time under different environmental conditions. The usual devices for controlling and measuring the gain of electron multipliers require calibrated light sources with switching circuitry, measurement of the input direct current which interferes with the input signal, or other disadvantageous arrangements. Examples of prior art circuits of this type are found in U.S. Pat. No. 3,714,441 issued Jan. 30, 1973 and U.S. Pat. No. 3,337,737 issued Aug. 22, 1967, with the latter being assigned to the same assignee as the instant application.

SUMMARY OF THE INVENTION

It is therefore the primary object of the present invention to provide an improved system for measuring and controlling electron multiplier gain by utilizing particular available output current relationships of the multiplier.

This is accomplished by determining the ratio of the mean square output noise current at the anode of the multiplier to the direct current at the anode, which is shown to be proportional to gain. In one embodiment the output of the multiplier is coupled to a d.c. wide band amplifier and parallel load resistor and small capacitor circuit which provide a low pass filter and convert the anode direct current and noise current to voltages to be read on d.c. and a.c. voltmeters. The a.c. voltmeter has a narrow frequency band filter to separate the noise signal from the input signal of the scene. The gain is proportional to the ratio of the mean square a.c. voltage to the d.c. voltage. This is compared with a reference level and the high voltage supply of the multiplier is adjusted to obtain the desired gain.

In another embodiment, an automatic control circuit replaces the voltmeters. The d.c. output voltage path from the first wide band operational amplifier includes another amplifier and long time constant parallel RC network which averages the direct voltage signal applied to one input of a first analogue multiplier stage. The a.c. noise signal path includes another amplifier and parallel short time constant RC filter, an analogue multiplier squaring circuit and a further amplifier and parallel long time constant averaging filter which also connects to the first analogue multiplier. The output of the latter stage is the ratio of the mean square anode noise signal to the anode direct voltage which is fed into an operational amplifier and compared with a fixed d.c. reference signal. An error signal is obtained which is then used to vary the high voltage supply to the multiplier to automatically control the gain. The details of the invention and other objects and advantages will become apparent from the following description in conjunction with the accompany drawings.

DESCRIPTION OF THE PREFERRED EMBODIMENT

It has been found that the gain of a photomultiplier is proportional to the ratio of the mean square output noise current to the direct current at the anode. The mathematical derivation can be shown as follows:

Direct current output of the anode of an electron multiplier is given in equation 1 as:

$$T_{out} = (\text{Gain})\,(I_{in}), \qquad \text{Eq. 1.}$$

where $I_{in}$ is the dirrect current input to the multiplier. Therefore, $$\text{Gain (current gain)} = \frac{I_{out}}{I_{in}}$$

For low noise multipliers there is also an a.c. relationship for shot noise at the anode, $$i_{out} = (\text{Gain})\,(i_{in}) = \text{Gain}\,(2eKI_{in}\Delta f)^{1/2} \qquad \text{Eq. 2.}$$

where $e = 1.602 \times 10^{-19}$ coulmbs/electron, $\Delta f =$ Bandwidth, and $K$ is a noise factor for the multiplier. $K$ is a function of dynode gain depending primarily on the gain at the first dynode, a constant for constant photocathode to dynode potential.

Equations 1 and 2 are rearranged to eliminate $I_{in}$ and solve for Gain.

$$i^2_{out} = \text{Gain}^2\,(2eK\Delta f\,I_{in}),\ \text{and}\ I_{in} = \frac{i^2_{out}}{(2eK\Delta f)\,\text{Gain}^2}$$

By substitution into Equation 1, $I_{out} = \frac{i^2_{out}}{2eK\Delta f\,\text{Gain}}$, and $$\text{Gain} = \frac{i^2_{out}}{I_{out}}\;\frac{1}{2eK\Delta f}$$

All the terms to the right of the equal sign are known system calibration factors or are measurable at the anode. Thus, for relative gain stabilization, these factors do not have to be specified, except that they are constant. Gain is therefore proportional to the mean square anode noise current, $i^2$ out, divided by direct current, $I_{out}$, at the anode, without measuring input direct current. This relationship can now be used in a system to measure and control the gain of an electron multiplier.

Figure 1:
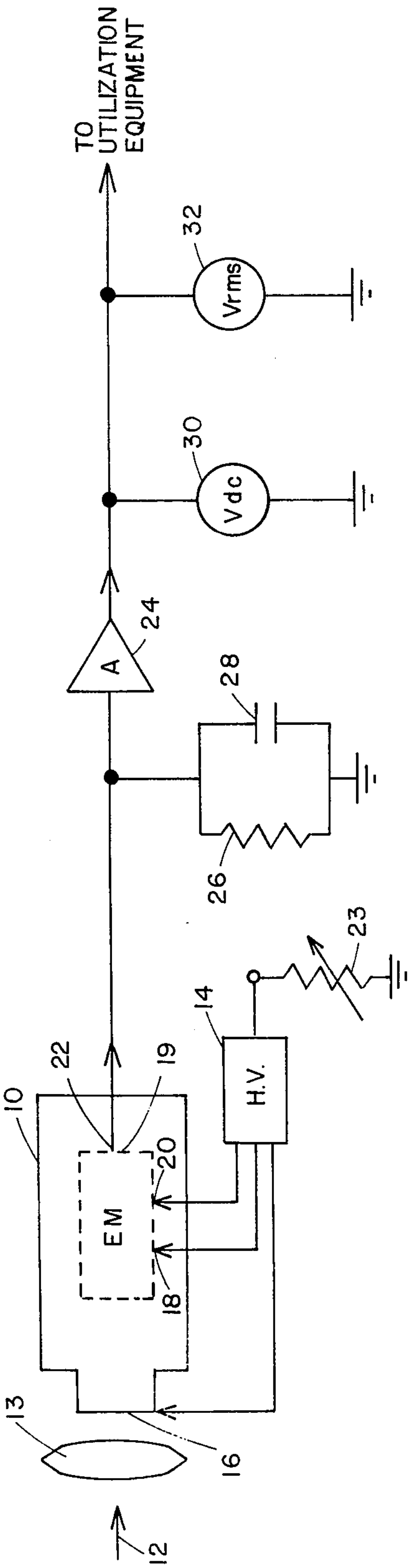
FIG. 1 shows a schematic diagram of a gain measuring system according to the present invention.

As shown in FIG. 1, a photomultiplier tube 10 or other light sensitive electron multiplier device, receives light from an input source or scene 12 via lens 13. A regulated high voltage supply 14 applies accelerating direct voltages to the electron emissive photocathode 16 at the input end, the first input dynode 18 of the electron multiplier 19, the plurality of successive dynodes 20 and the output anode 22, the latter of which may be at ground potential. Typical voltages may be −1500 V on the photocathode, −1200 V on the first dynode and zero for the output anode. Output signal current is coupled to a d.c. wide band amplifier 24 and a parallel RC network including a load resistor 26 and small capacitor 28. These provide a buffer stage to isolate the photomultiplier from the other connected devices. The value of load resistor 26 may be anywhere from 50 ohms to megohms depending upon the equipment with which it is connected and used. The load resistor converts the direct current output and anode noise current to voltages. The capacitor 28 may be inherent circuit capacitance or a small capacitor of from a few picofarads to 50 pf which, with the resistor, provides a low pass filter. In some cases the amplifier may be omitted. The output direct voltage and noise signals are then read on d.c. and a.c. voltmeters 30, 32, respectively.

The a.c. voltmeter reads the rms voltage in a selected narrow frequency band, $\Delta f$, either higher or lower than the incoming signal frequency. The input scene provides the required shot noise signal, but the output noise current must be derived from a portion of the frequency spectrum not used by the input signal from the scene to avoid errors. In order to separate the scene information from the noise signal, the a.c. voltmeter includes a narrow frequency band filter. The frequency range in which the system operates is very wide and depends upon the external equipment to be utilized. In some cases an added series bandpass filter may also be employed to connect to the equipment to eliminate undesired noise.

The gain of the multiplier is then calculated from the ratio of the square of the a.c. voltmeter reading to the d.c. voltmeter reading, wherein Gain = $V^2_{rms}/V_{d.c.}$. This gain may then be compared with a desired or reference level and the high voltage supply 14 is manually adjusted by means of a potentiometer 23 to obtain the desired readings.

As an alternative to the use of a frequency bandwidth above or below the frequency spectrum of the scene illumination, a time sharing system could be employed using a direct current lamp having a constant light output as a reference. The lamp and scene would be blocked from the photocathode at different times and the respective outputs calibrated and read for comparison with the reference.

Figure 2:
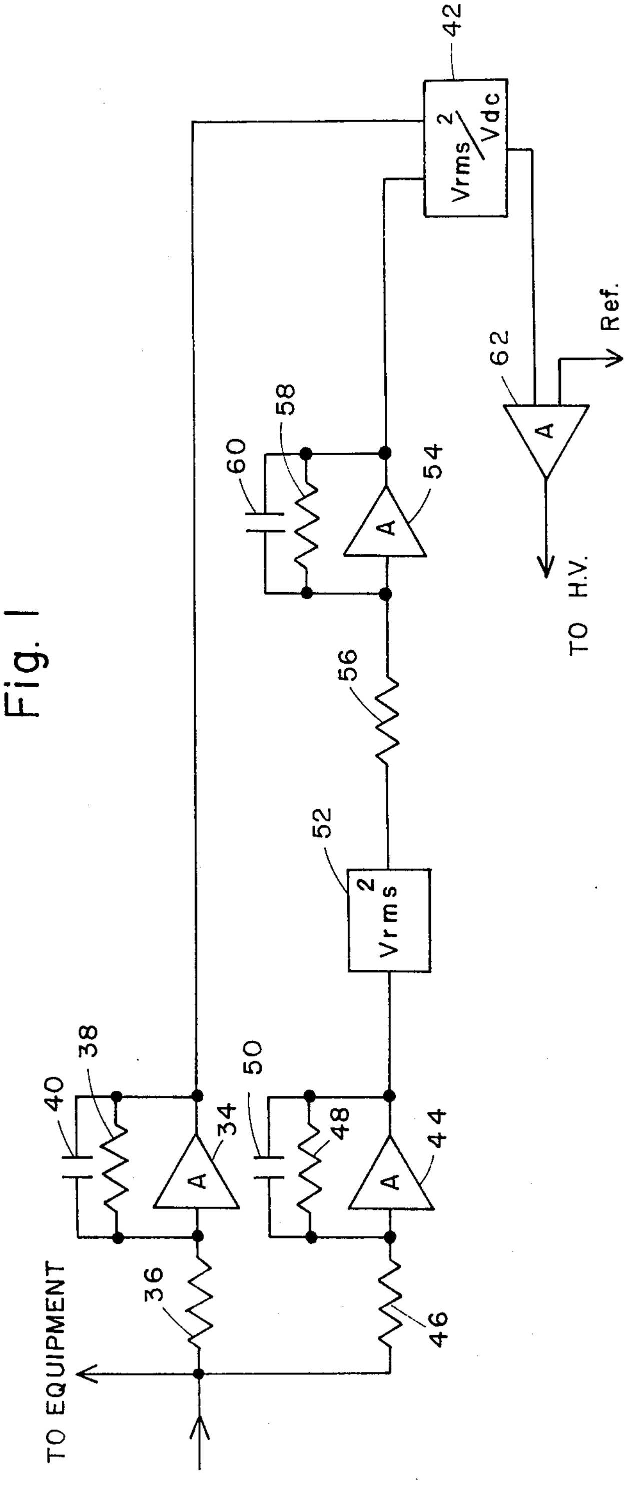
FIG. 2 shows a schematic diagram of a portion of the novel automatic gain control system.

A fully automatic gain control circuit is obtained by replacing the voltmeters with the system shown in FIG. 2, wherein the first portion of the system through amplifier 24 is substantially the same as in FIG. 1 except for the potentiometer 23 which may be replaced by a feedback connection. The upper circuit path replaces the d.c. voltmeter and the lower circuit path replaces the a.c. voltmeter portions, with the combined paths being fed back to control the high voltage supply. Output from amplifier 24 is applied to a buffer stage including a second operational amplifier 34 having a series resistor 36 forming part of a voltage divider with resistor 38 in parallel with the amplifier. The ratio of the two resistors determines the gain of this amplifier. In parallel with resistor 38 is a relatively large capacitor 40 which together with this resistor provides an integrating circuit having a long time constant relative to the desired frequency band to average the direct voltage output signal and reduce noise. As a typical value, resistor 38 may be about 10K ohms and capacitor 40 about 10 microfarads for a 0.1 second time constant. The direct voltage output signal $V_{d.c.}$ from amplifier 34 is then applied as one input signal to an analogue multiplier stage 42.

The output of amplifier 24 is also applied to another operational amplifier 44 in the lower a.c. noise signal portion of the circuit. Voltage divider resistors 46, 48, in series and parallel with the amplifier, provide a gain control, while resistor 48 and parallel capacitor 50 provide a relatively short time constant filter for the selected frequency band. The RC time constant may be in the order of one-hundredth of that of d.c. amplifier stage 34, for example, 0.001 sec. compared with 0.1 sec for stage 34. The noise voltage output signal of amplifier 44 is coupled to a squaring circuit 52 which may be an analogue multiplier stage to provide a signal output which is the square of the input to that stage. The output of stage 52 is then coupled to another operational amplifier 54 having series-parallel resistive voltage dividers 56, 58 and a capacitor 60 in parallel with resistor 58. This circuit has a long time constant relative to the desired frequency band to integrate the mean square noise signal voltage. The output of this circuit is the mean square value of noise voltage signal, $V^2$rms, which is applied as a second input to the analogue multiplier stage 42.

Stage 42 then provides a combined output signal which is the ratio of the square of noise voltage output signal to the direct d.c. voltage output signal and is proportional to gain. This gain signal is applied to a further operational amplifier stage 62 wherein the gain signal is compared with a stable fixed direct voltage reference and an output gain error signal is obtained. The difference or error signal is then fed back to the high voltage supply circuit 14 which controls the direct current in the electron multiplier and in turn controls the gain. The connection between amplifier 62 and high voltage supply 14 may be made in place of potentiometer 23 of FIG. 1.

Thus, an automatic gain control circuit is provided for electron multipliers which utilizes the ratio of the mean square anode noise current to the direct current output at the anode without requiring measurement of input direct current or use of precision calibrated standard light sources and switching circuitry.

While only two embodiments have been illustrated and described, it is apparent that other variations may be made in the particular configuration without departing from the scope of the invention as set forth in the appended claims.

What is claimed is:

1. Apparatus for controlling gain of an electron multiplier comprising:

electron multiplier means having input and output electrodes, direct voltage supply means applying direct voltage between said input and output electrodes, signal input means applying a direct current input signal to said input electrode, said output electrode providing a direct current output signal proportional to said direct current input signal multiplied by the gain of said multiplier and a noise current output signal, said gain being proportional to the ratio of the mean square of said noise current output signal with respect to said direct current output signal, load means for converting said direct and noise current output signals to a direct voltage output signal and a noise voltage output signal respectively, means for comparing said direct voltage output and noise voltage output signals to determine the gain of said multiplier with respect to a reference level, and means for varying said direct voltage supply means to control said gain of said electron multiplier in accordance with the differences of said direct voltage output and noise voltage output signals with respect to said reference level.

2. The apparatus of claim 1 including wide band amplifier means for amplifying said direct voltage output and noise voltage output signals, said load means including a resistor and parallel capacitor connected to said amplifier.

3. The apparatus of claim 2 wherein said means for comparing said voltage includes a direct current voltmeter and an alternating current voltmeter.

4. The apparatus of claim 3 wherein said electron multiplier is a photomultiplier, said signal input means including a source of light of a given frequency spectrum providing said direct current input signal to said input electrode, said alternating current voltmeter including frequency selective means to receive said noise signal in a narrow frequency band out of said frequency spectrum of said input signal from said source.

5. The apparatus of claim 2 wherein said electron multiplier is a photomultiplier, said signal input means including a source of light having a given frequency spectrum providing said direct current input signal to said input electrode, said means for comparing said direct voltage output and noise voltage output signals including a first operational amplifier coupled to said wide band amplifier, said first operational amplifier including frequency selective means having a long time constant relative to a narrow frequency band out of said frequency spectrum of said input signal from said source to provide an average direct voltage output signal, a second operational amplifier coupled to said wide band amplifier including frequency selective bandpass means having a short time constant relative to said narrow frequency band to provide a noise voltage output signal, squaring circuit means coupled to said second operational amplifier providing an output signal proportional to the square of said noise voltage signal, a third operational amplifier coupled to said squaring means and including frequency selective means having a long time constant relative to said frequency band to average out short variations of noise voltage output signal from said squaring circuit, and analogue multiplier means coupled to said first and third operational amplifiers to provide an output signal proportional to the mean square of said noise voltage output signal divided by said average direct voltage output signal, and a fourth operational amplifier coupled to said analogue multiplier, said fourth amplifier including a reference signal and means to compare said output signal of said analogue multiplier with said reference signal and provide an error signal, said error signal being coupled to said direct voltage supply means to automatically vary said direct voltage applied to said input and output electrodes to control the gain of said electron multiplier.

6. The apparatus of claim 5 wherein said frequency selective means are parallel resistor-capacitor networks connected across said amplifiers.

* * * * *